(No Model.)

H. CLAYTON.
MEDICAL AND NURSERY SPOON.

No. 244,551. Patented July 19, 1881.

Witnesses.
W. H. Mortimer.
A. C. Kiskadden.

Inventor
Herbert Clayton,
per
F. A. Lehmann,
Atty

United States Patent Office.

HERBERT CLAYTON, OF CINCINNATI, OHIO.

MEDICAL AND NURSERY SPOON.

SPECIFICATION forming part of Letters Patent No. 244,551, dated July 19, 1881.

Application filed June 3, 1881. (No model.)

*To all whom it may concern:*

Be it known that I, HERBERT CLAYTON, of Cincinnati, in the county of Hamilton and State of Ohio, have invented certain new and useful Improvements in Medicine and Nursery Spoons; and I do hereby declare the following to be a full, clear, and exact description of the invention, such as will enable others skilled in the art to which it pertains to make and use it, reference being had to the accompanying drawings, which form part of this specification.

My invention relates to an improvement in medicine and nursery spoons; and it consists in a porcelain spoon which is provided with a removable metal cover which is sprung into position.

It still further consists in a porcelain spoon which has its handle strengthened by a wire and its outer end turned downward to form a support, and which has grooves formed in its bowl to receive a metallic cover, as will be more fully described hereinafter.

The object of my invention is to prevent the handle of the spoon from breaking too readily, and to provide the bowl with a removable cover which fits tightly enough in position to prevent any of the medicine or food in the spoon from spilling out, and which can be readily removed for the purpose of allowing the spoon to be cleaned.

Figure 1:
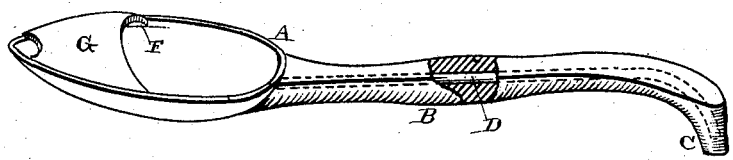
Figure 2:
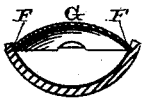

Figure 1 is a perspective of my invention. Fig. 2 is a vertical cross-section taken through the bowl of the spoon.

A represents a spoon, which is preferably made of porcelain or other similar material, and which has its handle B provided with a turned-down end, C, for the purpose of supporting the spoon upon the table in a horizontal position, so as to allow the spoon to be filled without having to hold it in the hand.

The handles of porcelain spoons are easily broken whenever they are dropped, even for a small distance, or any strain is brought to bear upon them, and when the handle has once been broken the spoon is of little or no account.

In order to strengthen the handle and to make it perfectly safe under any and all circumstances, I insert a wire, D, into the handle while the spoon is in the course of manufacture, and this wire forms the center of the handle from one end to the other. Should the handle at any time become broken, it can only be cracked at most, for the wire will serve as a union which will bind the two parts firmly together. This wire renders the handle stronger and adds greatly to the value of the spoon.

The bowl of the spoon is formed as usual, and upon the inner sides of its edges there are formed the grooves F, of any suitable depth, and which extend over nearly to the point of the bowl. Into these grooves is sprung the flexible adjustable elastic cover G, which is cut away at its outer end, as shown, to form an opening through which the food or medicine is poured out, and is cut away at its inner end so as to form an enlarged opening into which the food or medicine can be readily inserted. As this cover is made tapering, and as the grooves in the sides of the bowl are also made tapering, the cover can be adjusted back and forth, so as to enlarge or decrease the size of the opening through which the food or medicine is to be taken, as necessity may require. This cover fits in the groove sufficiently tight to prevent any spilling of the medicine or food over the sides or the edges of the spoon, and yet can be readily removed for the purpose of cleaning the spoon or for using it for ordinary purposes.

I am aware that a removable cover has been used in connection with medicine-spoons; but these covers have been slipped over the top edge of the spoon, and held in position by means of a turned-down flange on each side; but by this construction the cover cannot be made to fit the bowl tight enough to prevent its contents from being spilled, and this I disclaim.

Having thus described my invention, I claim—

1. A medicine and nursery spoon having a porcelain bowl, in combination with a removable metallic cover which is sprung into grooves made in the sides of the bowl, substantially as shown.

2. The combination of a porcelain spoon having the wire D inserted in the handle, and having the outer end of the handle turned down so as to form the support C, and provided with the grooves F in opposite sides of the bowl, with a removable elastic cover, G, which is sprung in the grooves, substantially as described.

In testimony whereof I affix my signature in presence of two witnesses.

HERBERT CLAYTON.

Witnesses:
M. TEMPEST,
THOMAS COPE.